March 19, 1957  E. S. COOK  2,785,932
FLUID PRESSURE BRAKE APPARATUS
Filed Sept. 11, 1953  2 Sheets-Sheet 1

INVENTOR.
Earle S. Cook
BY
Adelbert A. Steinmiller
ATTORNEY

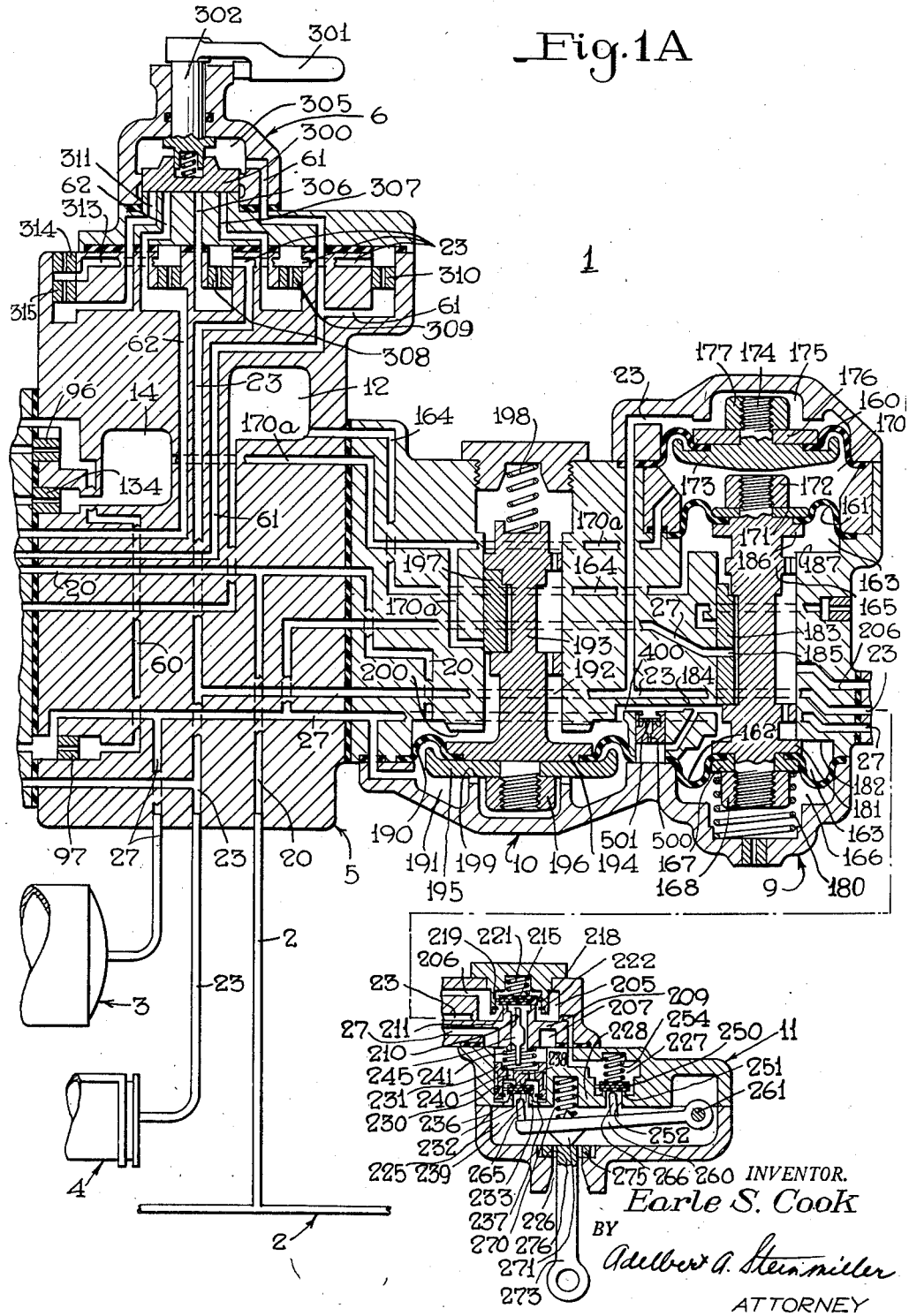

United States Patent Office 2,785,932
Patented Mar. 19, 1957

2,785,932

FLUID PRESSURE BRAKE APPARATUS

Earle S. Cook, Forest Hills, Pa., assignor to Westinghouse Air Brake Company, Wilmerding, Pa., a corporation of Pennsylvania Application September 11, 1953, Serial No. 379,543

7 Claims. (Cl. 303—60)

This invention relates to fluid pressure brake apparatus and more particularly to fluid pressure brake apparatus of the type disclosed in my U. S. Patent application Serial No. 201,846, filed December 20, 1950, for use on European railway cars.

The prime object of the invention is to provide an improved brake apparatus of the above type.

Other objects and advantages will become apparent from the following more detailed description of the invention.

Figure 1:
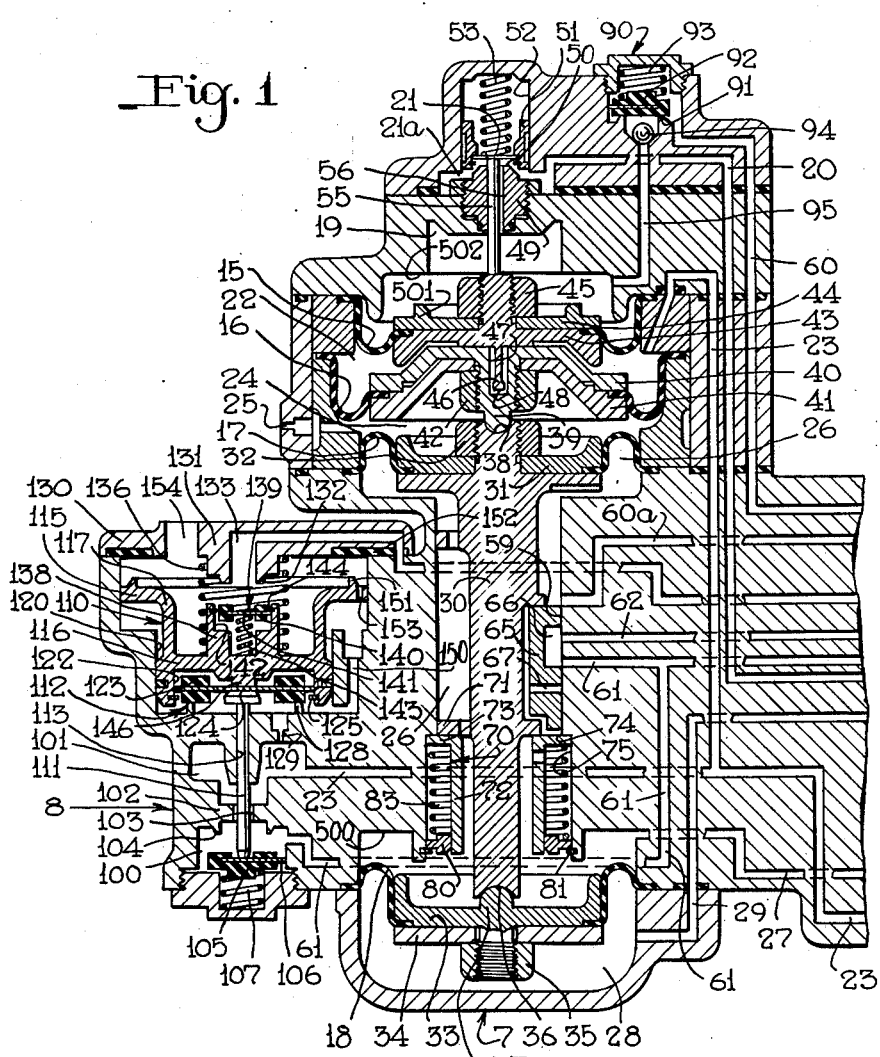
Figure 2:
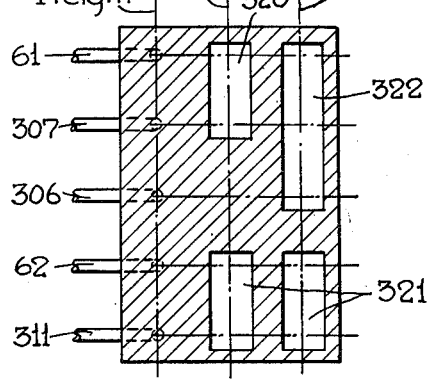

In the accompanying drawings; Figs. 1–1A, when the right-hand edge of Fig. 1 is matched with the left-hand edge of Fig. 1A, is a diagrammatic view of a fluid pressure brake apparatus embodying the invention, and Fig. 2 is a diagrammatic development view of a control valve device shown in section in Fig. 1A, and showing communications established in different positions of said device.

*Description*

As shown in the drawing, the brake equipment embodying the invention, comprises a brake controlling valve device 1, adapted to operate in response to a reduction in pressure in a brake pipe 2 to control supply of fluid under pressure from a supply reservoir 3 to a brake cylinder device 4 to apply brakes on a railway car, and adapted to operate in response to charging of said brake pipe with fluid under pressure to charge said supply reservoir with fluid under pressure and to release fluid under pressure from said brake cylinder device.

The brake controlling valve device 1 comprises a pipe bracket 5 to which the brake pipe 2, supply reservoir 3, and brake cylinder device 4 are adapted to be connected and on one face of which is mounted a service selector valve device 6, on another face of which is mounted a portion including a graduating control device 7 and a brake cylinder inshot control valve device 8, and on still another face of which is mounted a portion including a charging cutoff valve device 9, a quick service control valve device 10 and a combined brake cylinder, supply reservoir and control reservoir release valve device 11.

Cast within the pipe bracket 5 is a control reservoir or chamber 12, and a quick service reservoir or volume 14.

The graduating control device 7 of the brake controlling valve device comprises a casing containing a stack of four coaxially-arranged, spaced-apart, flexible diaphragms 15, 16, 17 and 18 arranged in the order identified and each clamped around its marginal edge in the casing, the diaphragm 16 being of greater diameter than the others which are all of substantially the same diameter.

The outer face of diaphragm 15 is exposed to pressure of fluid in a brake pipe pressure chamber 19 which is adapted to be availed of fluid under pressure from the brake pipe 2 by way of a brake pipe passage 20 under the control of a dual-function control valve 21 which is disposed in a supply chamber 21a connected to said passage and serves as both a retarded release control valve means as well as a supply reservoir recharge-supply-control valve means.

Between the diaphragms 15 and 16 is a brake cylinder pressure chamber 22 which is in constant communication with the brake cylinder device 4 by way of a passage 23.

Between diaphragms 16 and 17 is an atmospheric chamber 24 in constant communication with atmosphere through a passage or port 25, while a slide valve chamber 26 formed between the diaphragms 17 and 18 is in constant communication with the supply reservoir 3 by way of a passage and pipe 27. The outer face of the diaphragm 18 is exposed to pressure of fluid in a control reservoir pressure chamber 28 which is in constant communication with the control reservoir 12 by way of a passage 29.

A slide valve stem 30 is disposed in the slide valve chamber 26 which is attached at its one end to the diaphragm 17 through the medium of a flange portion of the stem and a diaphragm follower 31 disposed in atmospheric chamber 24 and secured to said stem through the medium of the usual nut 32 to clamp said diaphragm to said stem between its flanged portion and said follower. The opposite end of the slide valve stem 30 has an abutting connection with the diaphragm 18 through the medium of the usual followers 33 and 34 disposed on opposite sides of said diaphragm and clamped thereto by action of the usual nut 35, said opposite end of the slide valve stem being provided with a cylindrical recessed surface 36 for rockable point contact with a portion 37 of the diaphragm follower 33 projecting centrally therefrom, the surface of said projecting portion being substantially spherical and of lesser radius than the radius of said recessed surface to allow for self-alignment of the diaphragm assemblage during its operative movement. The end of the slide valve stem 30 attached to the diaphragm 17 is provided with a similar recessed surface 38 for cooperation with a similar projecting element 39 attached to a diaphragm follower 40 clamped to the diaphragm 16 to bear the same relationship between the diaphragm assemblage including said diaphragm follower 40 and said stem, said diaphragm being clamped between said diaphragm follower and a diaphragm follower 41 by action of the usual nut 42.

Diaphragm 15 is clamped between oppositely arranged diaphragm followers 43 and 44 disposed in the brake cylinder pressure chamber 22 and the brake pipe pressure chamber 19, respectively, by action of the usual nut 45 disposed in the latter chamber. The diaphragm follower 43 disposed in the brake cylinder pressure chamber 22 is provided with a centrally projecting portion 46 which extends into a central opening 47 formed in the diaphragm follower 40 of the diaphragm assemblage 16, 40, 41 and 42, to provide for guided relative movement between the two assemblages without any appreciable friction while allowing for self-alignment of said assemblages during such movement. The projecting portion 46 of the diaphragm follower 43, for the greater portion of its length, is of lesser diameter than the inner diameter of the opening 47 provided in the diaphragm follower 40, while the extreme end of said projecting portion 46 is provided with a ball-like element 48 slidably cooperable with the wall of said opening to effect the previously mentioned guided movement while allowing for rockable self-alignment.

The graduating control device 7 further comprises a seat element 49 removably mounted in the casing in coaxial alignment with the diaphragm stack.

The control valve 21 is in the form of a disk which is properly guided for cooperation with a seat 50 in element 49 through the medium of a sleeve element 51 slidably mounted in a suitable bore 52 in the casing in coaxial alignment with said seat. A compression spring 53 disposed within the bore 52 cooperates with the casing to urge the valve 21 in the direction of its seat 50. A certain extent of lost motion is provided by virtue of the connection between the valve 21 and the sleeve 51 to allow for sufficient freedom of movement of the valve relative to said sleeve to permit tilting of the valve from its seat during a certain operating condition as will be described subsequently.

An operating stem in the form of a rod 55 is provided for the valve 21. The stem 55 is suitably attached at its one end to a stud portion of the follower 43 of the diaphragm assemblage which includes said follower and projects through the brake pipe pressure chamber 19 and through an opening 56 in the seat element 49 into abutment with the underside of the valve 21 for actuation of said valve in a direction away from said seat against opposition of the spring 53. The stem 55 is of lesser diameter than the opening 56 in the seat element 49 to allow for flow of fluid under pressure through said passage around said stem when valve 21 is unseated, and said stem is arranged in off-center relationship relative to the seat 50 and the valve 21 so that during initial unseating movement of stem in engagement with said valve, the latter will be tilted off its seat for more subtle control of admittance of fluid under pressure from the brake pipe 2 to the brake pipe pressure chamber 19, according to a well-known technique in the valve art.

The spring 53 is preferably a light bias spring and of value insufficient to effect any material unbalance of the diaphragm stack when valve 21 is being held unseated through the medium of the stem 55.

In the casing portion which includes the graduating control device 7 there is provided a supply reservoir charging passage 60a, which is adapted to be open to the slide valve chamber 26 by way of a port in a slide valve seat 59 which constitutes a portion of one wall of said slide valve chamber 26, as well as a brake cylinder passage 61 and a vent passage 62 which also opens to said slide valve seat 57 via respective ports.

The graduating control device 7 is further provided with a dual-function slide valve 65 which serves as both a brake controlling valve means as well as a supply reservoir recharge cut-off valve means. The slide valve 65 is slidably mounted on seat 59 and operably connected to the slide valve stem 30 for operation by movement of said stem in the usual manner by virtue of disposition within a recess or cavity formed in said stem; operative connection with said slide valve being established by abutting engagement with the end walls of said cavity. The slide valve 65 is provided with a cavity 66 of slightly greater length than the distance over the brake cylinder passage 61 seat port and the vent passage 62 seat port when disposed in registry therewith for establishing communication between the two passages.

A brake cylinder supply port 67 is also provided in the slide valve 65, one end of which port 67 is in constant communication with the slide valve chamber 26 while its opposite end is adapted for registry with the port of the brake cylinder passage 61 for admitting supply reservoir fluid from said slide valve chamber to said passage. The slide valve 65 is of such length, and the disposition of the ports for passages 60, 61 and 62 is such that in a Release position of said valve, in which it is shown in the drawing, the brake cylinder supply port 67 will be blanked off, the cavity 66 will be disposed in registry with the brake cylinder passage 61 port and the atmospheric passage 62 port to establish communication therebetween, while supply reservoir recharge passage 60a port is open to the slide valve chamber 26. When said supply valve is moved out of its Release position, in which it is shown in the drawing, in the direction of the recharge passage 60a port, said valve may be caused to assume an application position in which the brake cylinder supply port 67 is brought into registry with the brake cylinder passage 61 port, the cavity 66 in the slide valve is out of registry with said brake cylinder passage 61 port, and said slide valve covers the recharge passage 60a port.

The slide valve 65 also has a Lap position, in addition to and intermediate its Release position and its Service position, in which Lap position said slide valve covers the recharge passage 60a port with its cavity 66 out of registry with the brake cylinder passage 61 port and its brake cylinder supply port 67 blanked off and out of registry with said brake cylinder passage 61 port.

In addition, the graduating control device 7 comprises a spring stop element 70 against which a projecting flange 71 of the slide valve stem 30 is in contact when the slide valve 65 is in its Release position. The spring stop element 70 is in the form of a sleeve 72 of sufficient diameter to encircle a respective portion of the slide valve stem 30 with clearance and comprises an annular flange 73 attached to one end of said sleeve and extending radially outward for abutting engagement with an annular shoulder 74 formed in the casing and for slidable guided engagement with a cylindrical bore 75 formed in the casing to allow for guided movement of said stop element with movement of said slide valve stem in the direction of the control pressure chamber 28 when said slide valve is moved out of its previously defined nominal Release position in that particular direction. Sleeve 72 is slidably guided at its outer periphery by slidable contact with the inner wall of an annular spring stop element 80, which is retained in place within said bore 75 by a retaining ring 81 fit in a groove opening radially outward from said bore. The annular space encircling the sleeve element 72 within the bore 75 and between the flange 73 and the spring seat element 80 serves to accommodate a compression spring 83 disposed therein, one end of which is in abutment with said flange and the opposite end of which is in abutment with said spring stop.

By virtue of this arrangement, the slide valve stem 30, and thereby the diaphragm stack, is subjected to the resistance of the action of the spring 83 as transmitted thereto by way of the stop element 70 upon movement of said stack from release position in the direction of the control reservoir pressure chamber 28.

The value of the spring 83 is such that a certain slight differential, such as seven-tenths of a pound, for example, between the pressure of fluid in the brake pipe pressure chamber 19 over that in the control reservoir pressure chamber 28 when the brake cylinder pressure chamber 22 is void of fluid above atmospheric pressure is required to effect such movement of the diaphragm stack and, slide valve 65 for reasons which will hereinafter be made apparent.

A supply reservoir recharge check valve device 90 is provided, in association with the graduating control device 7, which check valve device comprises the usual annular seat 91 to accommodate the usual disk-shaped check valve 92 biased in the direction of the seat 91 by action of a compression spring 93. In addition, the device 90 comprises the usual ball check valve 94 arranged in series with valve 92 to cooperate with a respective seat to serve as an added precaution against leakage past valve 92. The inlet side of the check valve device 90 as controlled by both the ball check 94 and the disk-shaped check valve 92 is connected by way of a passage 95 to the brake pipe pressure chamber 19 in the graduating control device 7, while the output side of the check valve device is in constant communication with a branch of the supply reservoir recharge passage 60 by way of a recharge rate control choke 96 and in constant communication with the supply reservoir 3 by way of another branch of passage 60, a supply reservoir maintenance choke 97, and a branch of the passage 27.

The value of the spring 93 in engagement with the disk-shaped check valve 92 is such that a preponderance in pressure of fluid on the inlet side of the check valve device of 1.7 pounds, for example, is required to unseat same to establish communication between said input side and the output side, for reasons which hereinafter will become apparent.

The recharge choke 96 is of relatively great capacity compared to that of the supply reservoir maintenance choke 97, the latter being only of sufficient capacity to allow for make-up of fluid under pressure to the supply reservoir as fluid under pressure is employed from the latter to maintain brake cylinder pressure during normal degrees of brake cylinder leakage, while such choke 97 prevents make-up of fluid under pressure to the supply reservoir under brake cylinder leakage conditions at any appreciable rate if the brake cylinder leakage is excessive.

The brake cylinder inshot valve device 8 comprises a chamber 100 in constant communication with a branch of the brake cylinder passage 61, and a chamber 101 in constant communication with a branch of the passage 23 which is connected to the brake cylinder 4; the chamber 100 being separated from the chamber 101 by a partition 102 in which there is an opening 103 to allow for communication between the two chambers. The opening 103 in the partition 102 at one end is encircled by an annular valve seat 104 provided to accommodate a valve 105 disposed in chamber 100 for cooperation with said seat to control communication between the chambers 100 and 101 by way of said opening 103.

Valve 105 may take the form in which it is shown in the drawing as a poppet-type valve composed of resilient material suitably bonded to a metal element 106 slidably guided at its outer periphery by engagement with a portion of the defining walls of the chamber 100 for guided movement toward and away from the seat 104. A light compression spring 107 is arranged to bias the valve 105 in the direction of its seat.

For actuating the valve 105 against opposition of the bias of the spring 107 a piston 110 is provided which is operatively connected to said valve through the medium of a stem 111 and a piston-operation-modifying valve 112. Stem 111 is slidably guided adjacent its one end in a stem accommodating opening 113 formed in the casing, and said stem projects into and through the chamber 100, the opening 103 in partition 102, and the chamber 101 as well as opening 113 for abutting engagement centrally of the valve 112.

The piston 110 is provided with an annular portion 115 and a disk-like portion 116 integrally attached to said annular portion through the medium of a cylinder portion 117 of substantially the same outer diameter as that of said disk-like portion; said annular portion 115 having an outer diameter of greater diameter than that of the outer diameter of said disc-like portion, and the two portions being slidably accommodated within the larger and smaller portions of a counterbore 120 formed in the casing.

One face of the disk-like portion 116 of the piston 110 is recessed to accommodate disposition of the piston-operation-modifying valve 112 and provided with a cylindrical surface 122 for guiding cooperation with said piston-operation-modifying valve 112 for reasons which will hereinafter be made apparent.

The piston-operation-modifying valve 112 comprises an annular resilient valve portion 123 which is suitably bonded to a metal plate element 124 slidably accommodated at its outer periphery by the wall of the bore 122, and retained in place within the piston recess by a snap ring 125 fit into a groove in the piston opening radially outward from said bore.

The end wall of the smaller portion of the counterbore 120 is provided with an annular seat 128 coaxially aligned with said bore for accommodating the piston-operation-modifying valve 112. The interior area of valve 112 bounded by the annular seat 128 is constantly open to the chamber 101 by way of a restricted passage or choke 129. The opposite or larger end of the counterbore 120 is closed by a cap member 130 which is provided with a centrally projecting portion 131 which includes an annular valve seat 132 in encirclement of a passage 133 which is in constant open communication with the quick service volume 14 in the pipe bracket portion 5 by way of a choke 134.

The outer peripheral surface of the portion 131 of cap member 130 serves to locate one end of a compression spring 136 which abuts said cap member and extends into abutment at its opposite end with the respective face of the disk-like portion 116 of the piston 110 for urging said piston in the direction of the seat 128.

Within the cylindrical portion 117 of the piston 110, and attached to and projecting from the respective face of the disk-like portion 116 of said piston, there is a centrally projecting element 138 which serves to locate the respective end of the spring 136 and to carry a quick service volume release control valve 139.

The quick service volume release control valve 139 may be of the poppet type as shown on the drawing comprising an annular resilient valve portion 140 of suitable dimensions as to be accommodated by the seat 132 and bonded to a plate element 141 slidably guided by the walls of a bore 142 formed in element 138. A light bias spring 143 is suitably accommodated within a recess formed in the projecting element 138 and arranged to cooperate with the quick service volume release control valve 139 so as to urge same to a normal position defined by contact of its plate 141 with an annular retaining element 144 disposed in a groove extending radially outward from the bore 142.

The recessed, piston-operation-modifying-valve-accommodating face of the piston 110 is provided with a centrally projecting element 146 for abutting engagement with the plate 124 of the piston-operation-modifying valve 112 to urge same in the direction of its seat 128 under the action of spring 136. In the seated position of the piston-operation-modifying valve 112, in which it is shown in the drawing and to which it is urged by spring 136, the stem 111 by abutment with the under side of the plate 124 of said valve 112, will be so disposed as to hold the valve 105 in chamber 100 unseated from its seat 104 against action of light bias spring 107.

The volume bounded by the larger portion of the counterbore 120 and the flange 115 and cylinder portions of the piston 110 is constantly open to the space encircling the piston-operation-modifying valve seat 128 through the medium of an unrestricted passage 150 in the casing.

The annular portion 115 of the piston 110 is provided with an integrally attached annular rib 151 which projects in the direction of the cover member 130 for sealing engagement with a resilient annular sealing member 152 associated with said cover member, which engagement defines an opposite limit position for travel of the piston during its operation, as will be described hereinafter. Also in the annular flange 115 there is provided a small leak port 153 of relatively low flow capacity which opens through said flange to opposite sides thereof, for reasons which hereinafter will be apparent. The leak port 153 is disposed in a position radially of the flange 115 which lies outside the annular rib 151.

The cover member 130 is provided with a relatively large port 154 opening therethrough for communication of the open largermost end of the counterbore 120 to the atmosphere. The port 154 in the cover member 130 is so located as to lie within the annular rib 151 attached to the piston 110 when the latter is in engagement with the annular seating element 152.

The cutoff valve device 9 comprises three spaced-apart coaxially arranged flexible diaphragms 160, 161 and 162 which are clamped around their edges between portions of the casing, the diaphragms 161 and 162 being of the same diameter and smaller than the diameter of diaphragm 160.

The two diaphragms 161 and 162 cooperate to form a control reservoir pressure chamber 163 between them which is constantly open to the control reservoir 12 by way of a passage 164, and said diaphragms are held in spaced-apart relationship by engagement of opposite ends of a slide valve stem 165.

One end of the slide valve stem 165 is reduced to extend centrally through diaphragm 162 into an atmospheric pressure chamber 166 and through a follower plate 167 in said chamber engaging the opposite side of said diaphragm, and through a nut 168 on the reduced portion of said stem engaging the latter plate 167 to clamp the central portion of said diaphragm to said end of said stem.

The opposite end of the slide valve stem 165 is also reduced to form an axially arranged portion extending centrally through the diaphragm 161 into a quick service volume pressure chamber 170 formed between the diaphragms 160, 161 and constantly connected to quick service volume 14 via a passage 170a. A diaphragm follower plate 171 disposed in chamber 170 engages the adjacent face of the diaphragm 161, and a nut 172 on the projecting portion of the slide valve stem between the adjacent end of said operating stem and said plate.

A follower plate 173 disposed in the quick service volume pressure chamber 170 engaging the adjacent face of diaphragm 160 has a stud 174 projecting from one face thereof through an opening provided centrally of diaphragm 160 into a brake cylinder pressure chamber 175 at the opposite side of said diaphragm. A follower plate 176 disposed in the brake cylinder pressure chamber 175 engages the adjacent face of the diaphragm 160, and a nut 177 on stud 174 clamps the central portion of said diaphragm between the plates 173 and 176.

A control spring 180 disposed in the atmospheric pressure chamber 166 acts on follower plate 167 for urging the several parts of the cutoff valve device 9 to a normal or charging position in which they are shown in the drawing defined by contact between the flanged portion 181 of the slide valve stem 165 and a shoulder 182 formed in the casing.

The cutoff valve device 9 further comprises a slide valve 183 operably associated with the stem 165 for controlling communication between the supply reservoir 3 and the control reservoir 12 as well as between both of these chambers and the brake pipe 2 by way of an initial charging choke 184.

The slide valve 183 comprises a port 185 adapted for registry with a branch of the supply reservoir passage 27 in the normal or charging position previously defined.

A second or cutoff position of the slide valve 183 in which the port 185 thereof is blanked off from the supply reservoir passage 27 is defined by contact between a flanged portion 186 of the stem 165 with a stop shoulder 187 in the casing.

The quick service valve device 10 comprises a flexible diaphragm 190 clamped around its edge in the casing. At one side of the diaphragm 190 there is a supply reservoir pressure chamber 191 in constant communication through a branch of passage 27 with the supply reservoir 3, while at the opposite side of said diaphragm there is a brake pipe pressure chamber 192 in constant communication through a branch of passage 20 with the brake pipe 2.

A slide valve stem 193, operatively connected to a slide valve 197, is disposed in the brake pipe pressure chamber 192 and suitably attached as by means of follower plates 194 and 195 and a nut 196 to the diaphragm 190, while acting upon the opposite end of said stem with a chosen relatively light pressure is a compression spring 198, which urges said stem and diaphragm assemblage in the direction of the supply reservoir pressure chamber 191 toward a lap position in which it is shown on the drawing, defined by engagement of the follower 195 with an annular stop shoulder 199 formed in the casing, and in which position the slide valve 197 laps off communication between a branch of the passage 170a and the brake pipe pressure chamber 192.

A stop shoulder 200 exposed to the brake pipe pressure chamber 192 adjacent to the diaphragm follower portion 194 of the slide valve stem 193 is adapted for engagement thereby to define a quick service position of said stem in which the slide valve 197 uncovers the quick service volume passage 170a to the brake pipe pressure chamber 192.

The combined brake cylinder, control reservoir, and supply reservoir, release valve device 11 comprises a control reservoir pressure chamber 205 constantly open to the control reservoir 12 by way of a passage 206 and the control reservoir pressure chamber 163 in the control reservoir cut-off valve device 9. Device 11 further comprises a supply reservoir pressure chamber 207 constantly connected to the supply reservoir by way of a branch of the passage 27; the control reservoir pressure chamber 205 being separated from the supply reservoir pressure chamber 207 by a partition 209 through which there extends a bore 210 between the two chambers. At one end of the bore 210 there is an annular valve seat 211 which projects into the control reservoir pressure chamber 205 in encirclement of the respective end of bore 210.

Disposed in the control reservoir pressure chamber 205 is a disc type valve 215 for controlling communication between said chamber and the supply reservoir pressure chamber 207 by way of the bore 210. Valve 215 may comprise the usual valve portion of resilient material for sealing contact with the valve seat 211, said valve portion being suitably mounted on a plate element which is slidably guided by peripheral contact with a bore 218 formed in an annular rib 219 projecting into the control reservoir pressure chamber 205 in encirclement of the said seat 211. A bias spring 221 disposed in the control reservoir pressure chamber 205 is suitably arranged to urge the valve 215 in the direction of its seat 211 toward a seated and closed position in which it is shown in the drawing in seating engagement with said seat 211. The usual retaining ring 222 at one end of the bore 218 provides for retention of the valve 215 within bore 210 by engagement with the plate portion of the valve when same is unseated.

The valve device 11 is further provided with an atmospheric pressure chamber 225 constantly open to the atmosphere through an opening 226 in the casing, and a brake cylinder pressure chamber 227 open to a branch of passage 23; the supply reservoir pressure and brake cylinder pressure chambers 207 and 227 being separated from said atmospheric pressure chamber 225 by means of a partition 228 formed in the casing.

A counterbore 230 extending between the supply reservoir pressure chamber 207 and the atmospheric pressure chamber 225 provides for accommodation of a valve cage element 231 which is recessed at one end to accommodate disposition of a disc type release valve 232 adapted for accommodation by an annular seat 233 formed in the casing at the narrow end of counterbore 230.

In the well-known manner as described hereinbefore, the release valve 232 comprises the usual annular valve portion of resilient material for engagement with the seat 233, said valve portion being suitably attached or bonded to a metal plate slidably guided at its outer periphery within a bore 236 formed in the side wall of the recess, the valve 232 being suitably retained within the confines of said recess by the usual keeper ring 237 disposed at one end of the bore 236.

Intermediate opposite ends of the valve cage member 231 there is a transverse wall 238 which comprises a centrally projecting element 239 for cooperation with the valve 232 for actuating same in the direction of its seat 233, the said transverse wall being provided with relatively large ports 240 outside the projecting element 239 and within the confines of the guide sleeve portion in said keeper element to allow for flow of fluid under pressure from the supply reservoir pressure chamber 207 to the atmospheric pressure chamber 225 when the release valve 232 is unseated. A bias spring 241 is interposed between the partition 209 in encirclement of the lower end of bore 210 and the transverse wall 238 associated with the release valve cage member 231 to urge the latter in the direction of the atmospheric chamber 225 to cause seating of the release valve 232 on its seat 233 through engagement between the projecting element 239 and said valve.

Interposed between the transverse wall 238 of valve cage 231 and the valve 215, and slidably guided within the bore 210 there is a valve actuating stem 245 which is adapted to be engaged by the central portion of said transverse wall to act as a medium through which said stem may be actuated into engagement with the valve 215 to unseat same against opposition of the bias spring 221.

Disposed in the brake cylinder pressure chamber 227 there is a brake cylinder release valve 250 of the same type as valves 215 and 232 which is cooperable with a seat 251 formed in the casing in encirclement of one end of an opening 252 in the partition 228 extending between said brake cylinder pressure chamber and the atmospheric chamber 225.

The brake cylinder release valve 250 is guided by slidable cooperation of its plate with a cylindrical wall of chamber 227, and a bias spring 254 is disposed in the brake cylinder pressure chamber 227 and suitably arranged to bias said brake cylinder release valve toward a seated position in engagement with seat 251, in which position it is shown in the drawing.

For actuating the release valves 215, 232 and 250 from their seated positions in which they are shown in the drawing to respective unseated, open positions, there is provided a valve actuating element 260 which is disposed in the atmospheric pressure chamber 225. The valve actuating element 260 is pivotally connected to the casing at one end via a pin 261 for movement toward and away from the release valves 232 and 250.

Valve actuating stems 265 and 266 are attached to the valve actuating element 260 for carriage thereby, said elements being arranged for projection into the openings beneath the release valves 232 and 250 to actuate same when the actuating element 260 is moved pivotally about pin 261 in the direction of said valves. The valve actuating element 260 is biased toward a repose position, in which it is shown in the drawing and in which the stems 265 and 266 attached thereto are out of engagement with the valves 232 and 250, by action of a bias spring 270 suitably associated therewith. Such repose position of actuating element 260 is defined by engagement of a follower element 271 attached to the lowermost side of said element 260 and projecting into engagement with one end of an operating lever 273 extending outwardly through the opening 226 in the casing to act as a medium through which said element 260 may be actuated by application of force externally of the casing. The uppermost end of the operating lever 273 with which the element 271 is in engagement is provided with a ring 275 attached thereto and adapted for cooperation with an annular shoulder 276 encircling the upper end of the opening 226 to define a normal or repose position of said lever in which it is shown in the drawing and in which said ring abuts said shoulder, as well as to act as a fulcrum point for rocking movement of said lever on said shoulder as will be described hereinafter.

The service selector valve device 6 is manually adjustable to provide for different rates of application and release of the brakes on a car according to the type of service in which the car is to be operated, that is, freight service, passenger service, or high speed passenger service. To this end the service selector valve device 6 comprises a rotary valve 300 having three different positions, namely, "Freight," "Passenger" and "High Speed Passenger" as indicated by legends in Fig. 2. Rotary valve 300 is adapted to be turned to these different positions by a manually operable handle 301 connected to said valve through an operating stem 302. The rotary valve 300 is contained in a chamber 305 to which a branch of the brake cylinder passage 61 is connected.

Connected to the seat of the rotary valve 300 are application passages 306 and 307 which are also connected to the brake cylinder passage 23 through chokes 308 and 309, respectively, and to passage 61 via passage 23 and a choke 310. Also connected to the seat of the rotary valve 300 are vent passage 62 and a release passage 311. Passage 62 is connected to the atmosphere by way of a choke 312, a passage 313, and a choke 314; while passage 311 is connected to passage 62 via passage 313 and choke 312 and is connected to the atmosphere by way of a choke 315, passage 313 and choke 314.

In the "Freight" position of the service selector valve device 6, the passages 311, 62, 306, 307 and 61 are all lapped by the rotary valve 300, whereby, as will be explained in detail later, the rate of a brake application will be controlled solely by choke 310 and the rate of brake release will be controlled solely by chokes 312 and 314.

In the "Passenger" position of the rotary valve 300, a cavity 320 therein opens the communication between passages 61 and 307 whereby the choke 309 is connected in parallel with the freight application choke 310, to combine capacities of these two chokes to control the rate of brake application in passenger service, while a second cavity 321 in said rotary valve device 6 opens a communication between passages 62 and 311 whereby the release choke 315 is connected in parallel with the release choke 312, the capacity of these two chokes being combined to control, in series with choke 314, the rate of brake release in passenger service.

In high speed passenger service of the rotary valve 300 a cavity 322 therein connects passages 61, 307 and 306 one with the other, whereby chokes 308, 309 and 310 are connected in parallel with each other to control the rate of brake application during high speed passenger service, while the cavity 321 maintains the release choke 315 connected in parallel with the release choke 312 for controlling, in series with choke 314, the rate of brake release in high speed passenger service.

*Operation*

With the brake equipment void of fluid under pressure, all parts of the equipment will assume the positions in which they are shown in the drawing, except the manually adjustable selector valve device 6 which for the time being will be assumed to be in freight position, in which position it is shown on the drawing.

*Initial charging of the brake equipment*

To initially charge the brake equipment on a train, as well as in recharging the brake equipment to effect a release of the brakes after a brake application, it is customary to move the usual engineer's brake valve device (not shown) on the locomotive first to a release position for supplying fluid at a relatively high pressure directly from the usual main reservoir on the locomotive to the brake pipe 2 at the locomotive, and then after the lapse of a period of time, as determined by the operator of the brake valve device according to different conditions, the brake valve device will be moved to running position to reduce the pressure of further supply of fluid to the brake pipe to a normal value for continued charging of the brake pipe throughout the train to the normal pressure to be carried therein. The pressure in the brake pipe on the first, perhaps fifteen, cars of the train will therefore be initially increased to a degree in excess of the degree normally carried. The degree of such overcharge of the brake pipe being greatest on the car coupled to the locomotive and decreasing from car to car back from the locomotive; the above-mentioned time which the brake valve device is allowed to remain in release position as well as the number of cars in the train and the equipment thereon, determine the number of cars on which the brake pipe becomes overcharged and of what duration.

Upon supply of fluid under pressure to the brake pipe 2 as above, to charge the control and supply reservoirs 3 and 12 on each car employing the subject brake equipment, on any particular car, fluid under pressure from the brake pipe 2 will flow by way of the respective brake pipe passage 20 in the respective brake equipment to the brake pipe pressure chamber 192 in the quick service valve device 10 and thence at a restricted rate to the control reservoir pressure chamber 163 in the control reservoir cutoff valve device 9 by way of the passage 400 and the initial charge limiting choke 184.

From the pressure chamber 163 in the control reservoir cutoff valve device 9 such fluid under pressure will flow to the supply reservoir 3 by way of the port 185 in slide valve 183 and passage and pipe 27 without restriction, as well as to the control reservoir 12 and control reservoir pressure chamber 28 in the graduating control device 7 by way of passages 164 and 29, thereby effecting pressurization of such chambers. Choke 184 acts to so limit admission of initial charge into the control and supply reservoirs 12 and 3 in the equipment in cars at the front end of the train as to reduce the tendency for such reservoirs to become overcharged during the period that the brake pipe is overcharged, while at the same time tending to assure a substantially uniform build-up in brake pipe pressure throughout the length of the train as the respective successive equipments on the various cars of the train become substantially simultaneously initially charged at the same rate.

According to a feature of the invention, while the initial charge limiting choke 184 in each of the brake equipments reduces the tendency for the respective control and supply reservoirs 12 and 3 to become overcharged during initial charging of such equipments, it is possible, if the brake pipe 2 on any particular car remains overcharged after the control and supply reservoirs 12 and 3 on that particular car have been pressurized to the normal degree, that same will become overcharged by continued flow of fluid under pressure thereto from the overcharged brake pipe by way of the initial charge limiting choke 184. However, subsequent reduction in the pressure in the brake pipe to its normal value on that particular car or cars will allow the overcharge pressure in the control and supply reservoirs 12 and 3 to dissipate at a relatively rapid rate by way of the control reservoir pressure chamber 163 in the cutoff valve device 9 and both the initial charge limiting choke 184 as well as through a choke 500 and past a check valve 501 back to the brake pipe 2 by way of the brake pipe pressure chamber 192 in the quick service valve device 10 and the brake pipe passage 20. Thus, it will be seen, that by virtue of the arrangement of the chokes 184 and 500 and of the check valve 501, initial charging of the control and supply reservoirs 12 and 3 in any particular brake equipment is admitted at a controlled rate by way of the initial charge limiting choke 184 to reduce the tendency for said reservoirs to become overcharged during overcharge of the brake pipe, while dissipation of overcharge of such reservoirs, if such condition exists, is provided for at a sufficient rate by automatic combination of the capacities of both the choke 184 and the choke 500.

Substantially at the same time that the respective supply reservoir 3 is being initially charged as above described, fluid under pressure admitted thereto via passage 27 will also flow simultaneously by way of a branch of the passage 27 into the supply reservoir pressure chamber 191 in the quick service valve device 10 and to the slide valve chamber 26 in the graduating control device 7 and thence from such chamber 26 by way of the passage 60a and the supply reservoir recharge choke 96 to the output side of the recharge limiting check valve device 90 by way of the passage 60.

It will be appreciated that since the supply reservoir pressure chamber 191 in the quick service valve device 10 is being charged by fluid under pressure from the brake pipe 2, the pressure of fluid in such supply reservoir pressure chamber 191 will never exceed that in the brake pipe pressure chamber 192 on the opposite side of the diaphragm 190 during initial charging, and that, therefore, the spring 198 in said quick service valve device 10 will maintain said device in its previously defined lap position in which the quick service volume passage 170a is maintained disconnected from said brake pipe pressure chamber 192 and thereby from the brake pipe.

At the same time, in each of the brake equipments thus being initially charged, fluid under pressure supplied to the brake pipe 2 will flow without restriction by way of passage 20 to the supply chamber 21a at the input side of the brake control valve 21 in the graduating control device 7 and thence, at the discretion and control of said valve 21, will flow through opening 56 into the brake pipe pressure chamber 19 in said graduating control device.

Since at this time the brake cylinder pressure chamber 22 in device 7 remains void of fluid above atmospheric pressure (in that said chamber 22 is connected to the atmosphere by way of the passage 23, chambers 101 and 100 in the brake cylinder inshot valve device 8, passage 61, port 66 in the slide valve 65 in the graduating control device 7, atmospheric vent passage 62, and chokes 312 and 314 associated with the service selector valve device 6) and pressure of fluid in the slide valve chamber 26 in said graduating control device 7 has no effect upon the balance of the diaphragm stack in said device 7, and since the chamber 24 between diaphragms 16 and 17 is constantly open to the atmosphere; during initial charging of the respective equipment, the balance of the diaphragm stack in the graduating control device 7 is determined by the opposing pressures of fluid established in the brake pipe pressure and control reservoir pressure chambers 19 and 28.

Also, it will be appreciated, that since the respective control reservoir pressure chamber 28 is being pressurized by fluid under pressure supplied from the brake pipe 2 on the particular car via choke 184, such pressure in chamber 28 will never exceed, during initial charging of the supply and control reservoirs 3 and 12, that in the brake pipe pressure chamber 19 in the respective graduating control device 7, so that at that time, the diaphragm stack will never tend to move or never be moved from its release position, in which it is shown in the drawing, in the direction of said brake pipe pressure chamber 19.

However, due to the restriction imposed by the initial charge limiting choke 184 to initial charging of the supply and control reservoirs 3 and 12, as well as to the chambers connected thereto, at any given time on any particular car, during such initial charging, brake pipe fluid transmitted without restriction to the supply chamber 21a in the respective graduating control device 7 will tend to exceed that in the control reservoir pressure chamber 28 in said device. The diaphragm stack in said device will respond to a preponderance in pressure in the brake pipe pressure chamber 19, as experienced therein by virtue of flow of brake pipe fluid from the supply chamber 21a by way of the open valve 21 and the opening 56, over the pressure in the control reservoir pressure chamber 28 above a certain degree, as determined by the value of the spring 83, to move the stack in the direction of said control reservoir pressure chamber 28 to cause movement of valve 21 relative to its seat 50 to so limit the rate of admission of pressurized brake pipe fluid from supply chamber 21a to chamber 19 that the degree in preponderance in pressure in chamber 19 over that in chamber 28 and hence in the supply reservoir 3 connected thereto via device 9, that the spring loaded check valve 92 will not become unseated during initial charging of the equipment.

As the result of such automatic action of the diaphragm stack in the graduating control device 7 on any particular car to limit the degree of pressurization of the brake pipe pressure chamber 19 to a value less than that required to unseat the check valve 92 as above described, it will be appreciated that the respective control and supply reservoirs 12 and 3 are initially charged exclusively by way of the initial charge limiting choke 184 as previously described. It will also be appreciated, that, in any particular brake equipment or equipments on cars such as on the rear of the train, where, during initial charging, the brake pipe pressure may be increasing at a relatively slow rate due to the pressure gradient in the brake pipe existing through the train, such relatively slow increase in brake pipe pressure may allow for substantial equalization of pressures across the initial charge limiting choke 184 so that the pressure of fluid in the brake pipe pressure chamber 19 in the graduating control device 7 and the pressure of fluid in the control reservoir pressure chamber 21 in said device 7 may be substantially equal. In which case, said diaphragm stack in said device 7 will remain in the release position in which it is shown in the drawing with the control valve 21 held unseated and affording relatively little restriction to flow of brake pipe fluid from supply chamber 21a into said brake pipe pressure chamber 19. However, under such conditions, it will be appreciated that since the control reservoir 12 and connected control reservoir pressure chamber 28 are connected to the supply reservoir 3 without restriction by way of the control reservoir pressure chamber 163 in the cutoff valve device 9, the supply reservoir pressure as experienced at the outlet side of the check valve 92 will substantially equal the pressure of brake pipe fluid at the input side of said check valve device as supplied thereto by way of the passage 95 from the brake pipe pressure chamber 19, and any charging of the supply reservoir 3 by way of said check valve device 90 is prevented while the initial charging takes place as previously described exclusively by way of the respective initial charge limiting choke 184.

Since the brake cylinder 4 on each car of the train on the respective brake control equipment remains vented to the atmosphere by way of pipe and passage 23, chambers 101, 100 in the inshot valve device 8, passage 61, port 66 in the slide valve 65 of the graduating control device 7 and vent passage 62, and since said chambers 101 and 100 in the brake cylinder inshot valve device 8 are therefore also vented to the atmosphere, said inshot valve device will remain in the position in which it is shown in the drawing during initial charging of the equipment, venting the respective quick service volume chamber 14 to the atmosphere by way of the choke 134, passage 133, the unseated valve 139, and port 154 in said inshot valve device.

Since pressurization of the control reservoir pressure chamber 163 in the cutoff valve device 9 does not effect the balance of the diaphragm stack therein, and since the quick service volume pressure chamber 170 as well as the brake cylinder pressure chamber 175 is said control reservoir cutoff valve device 9 remains vented to the atmosphere by way of respective passages 170a and 23, said control reservoir cutoff valve device 9 will, during initial charging, remain in the position in which it is shown in the drawing and in which its slide valve 183 is positioned to establish communication between its passage 185 and the supply reservoir passage 27 to allow for supply of fluid under pressure from the control reservoir pressure chamber 163 to said supply reservoir passage.

From the foregoing it will be apparent that subsequent to initial charging of the equipment on cars in the train in which pressure of fluid in the brake pipe has been established to a value normally carried and which value may vary throughout the length of the train according to the usual pressure gradient caused by leakage of fluid under pressure from the brake pipe, in the fluid pressure brake equipment on any particular car of the train, the respective control and supply reservoirs 12 and 3 will become charged to the same value as that existent in the brake pipe on that particular car.

*Effecting application of brakes*

When it is desired to effect an application of brakes, a reduction in pressure in the brake pipe 2 will be initiated by the engineer's brake valve device on the locomotive, in the well-know manner. In the brake equipment on any particular car, when the brake pipe pressure is reduced as just mentioned, the respective check valves 92 and 94 associated with the graduating control valve device 7 will prevent back-flow of fluid under pressure from the supply reservoir 3 and the control reservoir 2 to the brake pipe by way of passage 95, chamber 19, and passage 56 in said device 7 to the brake pipe passage 20, although momentarily there will be a slight trickle back through the initial charge limiting choke 184 and overcharge dissipating choke 500 by way of the brake pipe pressure chamber 192 in the quick service valve device 10, which however, is of no consequence during the operation under consideration.

As the result of the initial reduction in brake pipe pressure as effected by operation of the engineer's brake valve device on the locomotive, the pressure in the brake pipe 2 on the first car of the train will promptly reduce with that on locomotive and when reduced, for example, four-tenths of a pound, such reduction as experienced in the brake pipe pressure chamber 192 in the quick service valve device 10 relative to the pressure of fluid in the supply reservoir pressure chamber 191 on the opposite side of diaphragm 190 will create a sufficient differential in pressures on opposite side of said diaphragm to deflect the diaphragm against opposition of the spring 198 and move the slide valve 197 to a quick service position which opens said brake pipe pressure chamber 192 to the quick service volume passage 170a, such position being defined by contact between diaphragm follower 194 and the shoulder 200 in the casing.

Upon establishment of the connection between the brake pipe pressure chamber 192 in the quick service device 10 and the passage 170a as above mentioned, fluid under pressure will flow from the former by way of the latter to the respective quick service volume 14 and the quick service volume pressure chamber 170 in the control reservoir cutoff valve device 9. As a consequence, brake pipe pressure as experienced in the brake pipe pressure chamber 192 in the quick service valve device 10 will promptly equalize into the quick service volume 14 and the pressure chamber 170 in the control reservoir cutoff valve device 9. The pressure of fluid in the control reservoir pressure chamber 163 in the cutoff valve device 9 acting on diaphragms 161 and 162 being in balance insofar as action on the slide valve stem 165 is concerned, such pressurization of the quick service volume pressure chamber 170 in device 9 upon operation of the quick service valve device 10 as above described, will cause sufficient force to act on the diaphragm 161 in opposition to spring 180 to move the diaphragm stack in the direction of said spring and carry the slide valve 183 to its previously described lap position in which the passage 185 of the said slide valve is cut off from the supply reservoir passage 27 and the control reservoir pressure chamber 163 is cut off from the brake pipe 2 by way of choke 184, passage 400 and the brake pipe pressure chamber 192 in the quick service valve device 10. In this cutoff or lap position of the slide valve 183, it will be appreciated that the supply reservoir 3 is cut off from the control reservoir 12 and both of these reservoirs are cut off from the brake pipe 2.

By virtue of the connection established between the brake pipe 2 and the quick service volume 14 during operation of the quick service valve device 10 to move its slide valve 197 to quick service position as above described, fluid under pressure from the brake pipe will flow, by way of passage 20 and the brake pipe pressure chamber 192 in said device 10 into and through the passage 170a to the quick service volume chamber 14 as above mentioned. As a result of such flow, a fast local reduction in pressure in the brake pipe on that particular car will be experienced which will hasten reduction in pressure in the brake pipe on the next car of the train, which reduced pressure in the brake pipe on the next car, if such car is equipped with the subject brake apparatus, will be sufficient to cause operation of the quick service valve device 10 on that car to effect a similar local reduction in brake pipe pressure thereon and so on serially back through the train from car to car.

According to a feature of the invention, however, brake pipe fluid thus admitted to the respective quick service volume 14 will escape to the atmosphere at a controlled rate by way of the choke 134, passage 133, and the unseated valve 139 in the brake cylinder inshot valve device 8 and thence through the port 154 therein. Such flow of brake pipe fluid from the quick service volume 14 to the atmosphere affords a continued local venting of brake pipe fluid on a respective car employing the brake equipment which assures that a reduction in brake pipe pressure will be realized in a plurality of succeeding cars on which there may be no brake equipment sufficient to cause operation of the quick service valve device 10 on the following cars so equipped.

It should be pointed out that since in Europe brake controlling valve devices do not have to distinguish between different service and emergency rates of reductions in brake pipe pressure, as they do in the United States, the quick service reduction in brake pipe pressure effective by operation of the quick service valve device 10 may be as rapid as desired, which in conjunction with the very low differential in fluid pressures required to operate such quick service valve device, permits any desired rate of serial operation of the quick service valve devices in a train.

When the pressure of fluid in the brake pipe is reduced by operation of the quick service valve device 10, as just described, a corresponding reduction in pressure will occur in the brake pipe pressure chamber 19 in the graduating control device 7, and when the pressure in the said chamber thus becomes sufficiently reduced, the bottled-up control reservoir pressure in the control reservoir pressure chamber 28 in said device 7 will move the diaphragm stack upwardly, as viewed in the drawing, against the reduced brake pipe pressure and pressure of bias spring 53 in chamber 21a.

It is intended that the pile of diaphragms 15 to 18 move upwardly as just described, when brake pipe pressure in chamber 19 is reduced for example two or three pounds below control reservoir pressure in chamber 28. However, if the diaphragm pile does not move upwardly upon such reduction in brake pipe pressure, then by operation of the quick service valve device 10, pressure in the brake pipe 2 and chamber 19 will continue to be reduced relative to control reservoir pressure chamber 28 by way of the brake pipe pressure chamber 192 in said device 10, the passage 170a, the quick service volume 14, the choke 134, passage 133, the unseated valve 139 in the brake cylinder inshot valve device 8 and the port 154 therein, until a sufficient differential between such opposing pressures on the diaphragm stack obtains to insure such movement. It will thus be evident that the positive local quick service venting of fluid under pressure from the brake pipe by operation of the quick service valve device 10 will insure movement of the respective diaphragm stack on the brake-equipped car even if located on a train to the rear of a bunch of two or more non-brake-equipped cars, or cars provided with brake equipment which is not operating.

Since the quick service valve device 10 merely functions to establish and disestablsh communication between the brake pipe 2 and the quick service volume passage 170a by way of brake pipe pressure chamber 192, the slide valve 197 may be relatively small, so that said device 10 may be designed to dependably operate on a very slight reduction in brake pipe pressure, such as previously mentioned, to insure transmission of a sufficient quick service reduction in brake pipe pressure through a train as will cause prompt operation of all the quick service valve devices on the train serially, and to then positively insure movement of the respective multiple diaphragm graduating control device 7 out of its brake release position in which it is shown in the drawing, to an application position which will be presently described, even if said control device 7 is sluggish, for any reason, in its response to reducing brake pipe pressure.

When the diaphragm stack of the control device 7 thus moves upwardly in response to a reduction in brake pipe pressure in chamber 19, stem 30 will carry the slide valve 65 to its application position previously defined, in which the recharge passage and port 60a as well as vent passage 62 and brake cylinder passage 61 are lapped off one from the other, and the supply passage 67 is brought into registry with said brake cylinder passage 61 to allow for supply of fluid under pressure from the supply reservoir 3 to the brake cylinder 4 at a relatively rapid rate by way of the pipe and passage 27, the slide valve chamber 26 in device 7, said passage 67 in slide valve 65, said passage 61, chambers 100 and 101 and passage 103 in brake cylinder inshot valve device 8, and passage and pipe 23. Such unrestricted flow of fluid under pressure from the supply reservoir 3 to the brake cylinder as above described at a relatively rapid rate, insures that the slack in the brake rigging on the vehicle will be taken up and the brake shoe advanced into engagement with the wheel in a minimum possible time.

When the pressure of fluid in the brake cylinder, as supplied thereto as described above, attains a value, such as four pounds, for example, corresponding to attainment of the brake shoe into engagement with the wheel without any material application of force exerted by such shoe on the wheel, such brake cylinder pressure as experienced within the brake cylinder inshot valve device 8 in the chamber 101 as exposed to the valve 112 within the area bounded by its seat 128 will overcome the opposition of the spring 136 acting on the piston 110 and cause, through abutting engagement of said valve 112 with said piston, movement of the piston in the direction of the cover member 130, thereby unseating said valve 112. Whereas, prior to unseating of the valve 112, only the force created by pressure of fluid acting thereon within the confines of the seat 128 is realized by the piston 110 to oppose action of the spring 136, upon unseating of the valve 112, the entire face of the disk-like portion 116 of said valve 110 becomes exposed to brake cylinder pressure as admitted thereto from chamber 101 by way of the stabilizing choke 129, so that said piston will move at a relatively rapid rate to its uppermost position defined by engagement of its annular rib 151 with the annular sealing member 152 associated with the cover member 130, and in which position the valve 139 is held in seating engagement with the annular seat 132 by action of the spring 143 to close off further release of fluid under pressure from the brake pipe by way of the quick service volume 14, and choke 134.

Also in the brake cylinder inshot valve device 8, as the piston 110 moves from its lowermost position in which it is shown in the drawing to its uppermost position just described, reaction of the compression spring 107 will cause the valve 105 and stem 111 to follow movement of said piston until the said valve 105 assumes its closed position on seat 104, thereby closing off unrestricted communication between the supply reservoir 3 and the brake cylinder 4 by way of the chambers 100 and 101 in said inshot valve device 8. Subsequent to closure of the valve 105 of the inshot valve device 8, supply of fluid under pressure from reservoir 3 to the brake cylinder device 4 via chamber 26 in device 7 to effect application of a braking force between the brake shoe and the wheel (not shown) will continue at a controlled rate by way of port 67 in slide valve 65, a branch of the passage 61, choke 310 in the service seelctor valve device 6, if in its Freight position in which it is shown in the drawing, and passage and pipe 23. It will be appreciated that even during relatively unrestricted supply of fluid under pressure to the brake cylinder device 4 by way of the brake cylinder inshot device 8 as above described to effect initial movement of the brake shoe into engagement with the wheel, the supply of fluid under pressure to the brake cylinder device will be aided and abetted by some flow of fluid under pressure by way of the service selector valve device 6 currently in discussion, to further aid in the assurance that such initial engagement of the brake shoe will transpire in a minimum time.

According to position of the operator's handle 301 in the service selector valve device 6, the rate at which fluid under pressure will be supplied to effect an increase in degree of brake application is determined according to the type of train employing the subject equipment as well as the mode of operation of such train. In "Freight" position of the operator's handle 301, in which position it will occupy on a freight train, fluid under pressure is supplied to the brake cylinder to apply the brakes by way of the choke 310 as above described, and such supply will be at a relatively slow rate, which rate will be sufficient to adequately decelerate a relatively slow moving freight train. On a passenger train, the operator's handle 301 of the service selector valve device 6 will be moved to "Passenger" position to connect the input side of both chokes 309 and 310 to the brake cylinder supply passage 23 so that fluid under pressure supplied to the brake cylinder 4 from passage 61 will effect an increase in brake application at a more rapid rate than is attained in freight service where only the output from the choke 310 attains. In passenger trains that operate at high speeds where it is desired that the brake cylinder pressure be increased at an even more rapid rate, the handle 301 of the service selector valve device 6 will be moved to its "High Speed Passenger" position to connect the input side of the three chokes 308, 309 and 310 to passage 61 by way of the rotary valve chamber 305 to allow for an even faster rate of flow of fluid under pressure from the passage 61 to the brake cylinder supply passage 23 than prevailed in either of the other two positions of handle 301.

On any particular car, as fluid under pressure is supplied to the brake cylinder device 4 as just described, such pressure will also become effective in diaphragm chamber 22 in the graduating control device 7 to act, in assist with the brake pipe pressure in the chamber 19, in opposition to the control reservoir pressure in the chamber 28 on the diaphragm stack. Assuming that the reduction in brake pipe pressure effected by operation of the engineer's brake valve is limited to a chosen degree, then when the pressure obtained in the brake cylinder device 4 and as realized in chamber 22 in the graduating control device 7 is increased to a chosen value related to the degree of brake pipe reduction in chamber 19, such brake cylinder pressure acting in chamber 22, as assisted by the reduced brake pipe pressure in chamber 19, will move the diaphragm stack and the slide valve 65 in the direction of said control reservoir pressure chamber 28 to lap position to lap the application passage 67 in said slide valve, thereby preventing further supply of fluid under pressure to brake cylinder device 4 and thence said chamber 22. In lap position, the balance of the diaphragm stack in the device 7 is re-established and further movement of said stack in the direction of control reservoir pressure chamber 28 will terminate, so that with said slide valve 65 in lap position the fluid at the desired pressure in the brake cylinder will be retained. The pressure of fluid in the brake cylinder chamber 22 in the graduating control device 7 is felt by both the diaphragm 15 as well as the diaphragm 16, but since diaphragm 16 is larger in diameter than diaphragm 15, the diaphragm 16 realizes a greater force acting in a downward direction than is felt by the diaphragm 15 acting in an upward direction, with the result that the net force created by pressurization of the chamber 22 on the diaphragm stack acts in a direction in opposition to pressure of control reservoir fluid in the chamber 28. The proportionality of areas of the diaphragms 15 and 16 is such that it requires a brake cylinder pressure in chamber 22 of a certain proportion relative to the reduction in brake pipe pressure in chamber 19 to cause the diaphragm stack to assume the lap position as above described, such proportionality between brake pipe pressure and brake cylinder pressure as existing in the graduated control device 7 bearing a relationship of two and one-half to one, for example, that is, it requires two and one-half pounds of brake cylinder pressure in chamber 22 to every pound of reduction in brake pipe pressure in chamber 19 to cause the diaphragm stack to assume the position in which slide valve 65 is in its lap position closing off further supply of fluid under pressure from the supply reservoir 3 by way of slide valve chamber 26 to the brake cylinder 4 by way of port 67.

If the engineer on the locomotive desires to increase the degree of brake application, he will effect a further reduction in pressure in the brake pipe 2 throughout the train according to the increase in brake application desired. Upon the consequent reduction in pressure in the brake pipe 2 on a particular car, such reduction will be experienced in the brake pipe pressure chamber 19 in the respective graduating control device 7 to establish an unbalance of pressure forces acting on its diaphragm stack in favor of the control reservoir pressure in chamber 28, which unbalance will result in movement of said stack in the direction of chamber 19, thereby carrying the slide valve 65 out of its lap position to its application position in which the supply passage 67 is again in registry with the brake cylinder supply passage 61 to allow for admittance of fluid under pressure from the supply reservoir 3 to the respective brake cylinder 4, as previously described. Again in response to pressurization of the brake cylinder pressure chamber 22 in the graduating control device 7 in degree according to degree of reduction in brake pipe pressure as experienced in chamber 19, the diaphragm stack of said device 7 will move in the direction of the control reservoir pressure chamber 28 to carry the slide valve 65 to its lap position as before to hold the particular desired pressure in the brake cylinder device 4. By reducing the brake pipe pressure in such steps as desired, proportional increases in pressure may be provided in the brake cylinder device 4 to create any selected degree of braking, or if desired, the brake pipe pressure may be reduced in a single continuous stage, which continuous reduction will result in a proportional, continuous build-up in degree of brake application.

During operation of the graduating control device 7 to effect increase in the degree of brake application as above described, when the brake cylinder pressure as experienced in the chamber 22 in said device 7 equalizes with that in supply reservoir 3 at a maximum value such as fifty pounds for example, the diaphragm stack will remain in its application position by virtue of engagement of rib 501 of follower 44 with casing shoulder 502 should the brake pipe pressure continue to reduce to the extent of such as atmospheric pressure during effecting an application of brakes in an emergency.

From the above description, it will be clear that an application of brakes may be graduated on in any desired steps or may be made in a continuous step if desired. It will also be noted that closing of valve 105 in the inshot valve device will reduce the rate of supply of fluid under pressure to the respective brake cylinder device 4 according to the flow capacity of choke 310 or/and chokes 308 and 309 in the service selector valve device according to the position of the service selector valve handle 301 as determined by the type of train on which the brake equipment is being employed, or as to the type or manner of its operation in regard to vehicle speed. Valve 105 closes at a pressure in the brake cylinder device 4 which is just sufficient to cause the brake cylinder piston ot assume its application position, but not sufficient to produce effective braking, in order to prevent damaging run-in of slack in a train. The choke 310 or/and chokes 308 and 309 is or are then brought into play to govern the rate of effective brake application increase and will provide a sufficiently uniform rate of increase in brake application according to the type and service of the train employing the equipment to decelerate it or bring it to a stop without objectionable shock.

While the graduated control device 7 is in lap position, if there should be leakage of fluid under pressure from the brake cylinder device 4 so that the brake cylinder pressure is reduced below that called for by virtue of the brake pipe pressure existent in the brake pipe pressure chamber 19 in said device 7, such reduction in brake cylinder pressure as experienced in the brake cylinder pressure chamber 22 in device 7 will allow the pressure of fluid in the control reservoir pressure chamber 28 to move the diaphragm stack gradually upward to cause the slide valve 65 to carry the supply passage 67 into sufficient registry with the passage and port 61 as will permit supply reservoir fluid to flow from the slide valve chamber 26 in device 7 to the brake cylinder device 4 via the passages 61 and 23 and the respective choke or chokes in the service selector valve device to make-up for such reduction in brake cylinder pressure and maintain same in accord with the degree of reduction in brake pipe pressure. Subsequently, re-establishment of the proper brake cylinder pressure in chamber 22 in accord with the existent brake pipe pressure in chamber 19 will allow the latter pressure to move the diaphragm stack and slide valve 65 back to lap position.

If during a brake application, leakage of fluid under pressure from the brake cylinder device is such that the pressure of fluid in the supply reservoir 3 tends to become depleted as the result of automatic make-up in brake cylinder pressure by operation of the graduating control device 7 as above described, such depletion in supply reservoir pressure will be made-up or otherwise offset by supply of fluid under pressure from the brake pipe by way of the passage 20, the brake pipe pressure chamber 19 in the device 7, the passage 95, the check valve device 90, passage 60, supply reservoir maintenance choke 97 and passage and pipe 27. Such make-up of fluid under pressure to the supply reservoir 3 from the brake pipe 2 during the existence of a moderate degree of brake cylinder leakage maintenance, will occur at any time that the supply reservoir pressure as experienced at the output side of the check valve device 90 drops one and seven-tenths pounds, for example, below the brake pipe pressure as exists in brake pipe pressure chamber 19 in the control device 7 at the input side of said check valve device. At that time the preponderance in the pressure in passage 95 at the input side of the check valve device 90 will be sufficient to overcome the action of the spring 93 on check valve 92 to allow for such supply reservoir make-up from the brake pipe. The flow restricting action of the supply reservoir maintenance choke 97 on the flow of brake pipe fluid during such make-up supply to the supply reservoir 3 is such that should the brake cylinder leakage be extremely excessive and tend to deplete the supply reservoir at too rapid a rate, such supply reservoir make-up will be limited to a rate which will not over-reduce brake pipe pressure to the extent that subsequent release of the brakes by pressurization of the brake pipe would be placed in jeopardy.

Except in case of depletion due to maintaining brake cylinder pressure against leakage, the pressure of fluid in the supply reservoir 3 and thereby diaphragm chamber 191 of the quick service valve device 10 will always exceed that in the brake pipe pressure chamber 192 by a degree sufficient to hold the parts of said device in their uppermost or quick service position while the brake application is in effect. In case of depletion in supply reservoir pressure down to that in the brake pipe 2, spring 198 will, however, return the parts of the quick service valve device 10 to their lowermost or normal position in which they are shown in the drawing and in which position the slide valve 197 is positioned to lap off the quick service volume supply passage 170a from the brake pipe pressure chamber 192 in said device 10; such act, however, will have no effect on the rest of the equipment at such time.

If, however, during a brake application and with the quick service valve device 10 in its quick service position in which the quick service volume supply passage 170a is connected to the brake pipe pressure chamber 192, the brake pipe 2 and hence chamber 192 in device 10 become vented to the atmosphere such as by break-in-two of the hose couplings between the cars or at the engineer's brake valve device, fluid under pressure in the quick service volume 14 and in the cutoff valve device chamber 170 will become depressurized by equalization with the brake pipe to which said volume and chamber are connected by way of said chamber 192. According to a feature of the invention, under such circumstances, the cutoff valve device 9 will be maintained in its lap position by action of pressure of brake cylinder fluid in the chamber 175 in said device 9 which is constantly connected to the brake cylinder 4 by way of the passage 23. Such brake cylinder pressure as exists during a brake application acting on diaphragm 160 will cause same to be maintained in a deflected position in which the attached follower 173 is held in abutment with the end of the slide valve stem 165 to hold the stem and slide valve 183 in the lowermost lap position, opposite to that in which it is shown in the drawing, to maintain, under such circumstances, the control reservoir 12 and supply reservoir 3 cut off one from the other and both cut off from the brake pipe 2 by way of the initial charge limiting choke 184.

*Release of brake application*

In order to effect release of a brake application and to recharge the brake equipment with fluid under pressure, fluid under pressure will be supplied to the brake 2, thence to supply chamber 21a in the respective graduating control device 7 by way of the passage 20 connected to the brake pipe. With the control valve 21 in its open position, in which it will be when the diaphragm stack and slide valve 65 are in their respective lap positions, such brake pipe fluid as admitted to the supply chamber 21a will flow by way of the unseated valve 21 and passage 56 into the brake pipe pressure chamber 19 in said device 7 where such pressure will thereby be increased.

When the pressure of fluid in chamber 19 is thus increased sufficiently, it, acting in conjunction with spring 53, and with the brake cylinder pressure existent in chamber 22, will create a sufficient force on the diaphragm stack in opposition to the force created by the control reservoir pressure acting in chamber 28 on said stack to move the diaphragm stack downwardly, as viewed in the drawing, to its previously defined release position in which the flange 71 attached to slide valve stem 30 engages the spring stop element 70. In such release position of the diaphragm stack, communication is re-established by way of the cavity 66 in the slide valve 65 between the vent passage 62 and the brake cylinder passage 61, while the supply reservoir recharge passage 60a is opened to the slide valve chamber 26 in the device 7.

In each of the brake equipments, upon increase of pressure of brake pipe fluid in the brake pipe pressure chamber 19 in the device 7 to effect a release of the brakes or a reduction in the degree of brake application, if such increase in pressure of brake pipe fluid results in preponderance of pressure in passage 95 at the input side of the check valve device 90 over the supply reservoir pressure present in passage 60 at the output side of said check valve device to the extent of more than one and seven-tenths pounds, as hereinbefore described, such brake pipe pressure in passage 95 will be sufficient to cause unseating of the check valves 94 and 92 to allow for flow of brake pipe fluid from passage 95 into passage 60, and thence at a relatively slow rate by way of the maintenance choke 97 and passage and pipe 27 to the supply reservoir 3, which flow at this time is of an inconsequential amount. At the time, however, that the recharge port 60a is uncovered to the slide valve chamber 26 in the graduating control device 7, upon said device assuming its release position in response to the increase in pressure of fluid in the brake pipe pressure chamber 19, brake pipe fluid admitted to the passage 60 by way of the check valve device 90 as above described, will allow for a greater rate of flow of such fluid to reach the respective supply reservoir 3 for recharging same by way of the recharge choke 96, passage 60a, slide valve chamber 26 in device 7, and the respective branches of passage and pipe 27. The combined capacity of the recharge choke 96 and the maintenance choke 97 employed for relatively rapid rate of recharge of the supply reservoir 3 upon the graduating control device assuming its release position, the maintenance choke 97 being alone employed as previously described for the purpose of maintaining supply reservoir 3 pressure while the brakes are applied and there is leakage of fluid under pressure from the brake cylinder 4. The combined capacities of chokes 96 and 97 during supply reservoir recharge, however, do provide for some restriction of such recharge flow of brake pipe fluid to the supply reservoir 3 in the release position of the respective graduating control device 7 to assure that such recharge flow will not too suddenly steal so much brake pipe fluid locally from the brake pipe on a particular car as would jeopardize the propagation of the increase in the brake pipe pressure back through the train and prevent realization on the succeeding brake-equipped cars of the fact that a release of the brakes is called for. Recharging of the supply reservoir 3 by way of the chokes 96 and 97 will continue so long as the port 60a remains open to the slide valve chamber 26 and the brake pipe pressure in the passage 95 exceeds the supply reservoir pressure in the passage 60 sufficiently to the extent of one and seven-tenths pounds for example, to hold the check valve 92 unseated. When the supply reservoir pressure reaches the value of one and seven-tenths pounds, chosen for example, less than the brake pipe pressure, the spring 93 in the check valve device 90 will seat the check valve 92 to prevent further supply of fluid under pressure to the supply reservoir, at which time, further flow of fluid by way of passage 95 to the supply reservoir by way of passage 60 and either by way of choke 96 or by way of the maintenance choke 97 will terminate.

At the same time, upon the respective graduating control device 7 assuming its release position in response to increase in brake pipe pressure in its chamber 19 as hereinbefore described, fluid under pressure from the brake cylinder device 4 will release at a controlled rate to the atmosphere by way of the pipe and passage 23, choke 310 in the service selector valve device 6, the passage 61, the port or passage 66 in the slide valve 65 in said device 7, the passage 62 and either the choke 312 in series with the choke 314 in the service selector valve device 6 or the choke 312 in parallel with the choke 315 and both in series with said choke 314, according to the position of the handle 301 of the service selector valve device 6, to control the rate of such brake cylinder release of fluid under pressure from the brake cylinder device 4 according to the type of service or the type of train on which the equipment is being employed. The choke 312 alone in series with the choke 314 provides a control rate of release of fluid under pressure from the brake cylinder device 4 such as will assure a relatively even reduction in degree of brake application on relatively slow moving freight trains, while the combined capacity of both the choke 312 as well as the choke 315 in series with the choke 314 is employed in both regular passenger service as well as high speed passenger service to allow for a more rapid reduction in degree of brake application commensurate with the higher speed of operation of passenger trains.

Such reduction in brake cylinder pressure as effected by release of fluid under pressure therefrom at a controlled rate by way of the graduating control device 7 in its release position and the service selector valve device 6 as above-described, will result in a gradual reduction of brake cylinder pressure in proportion to restoration of brake pipe pressure and such reduction will be realized in the brake cylinder pressure chamber 22 in said graduating control device 7. If the restoration of brake pipe pressure is limited to a degree lower than normal brake pipe pressure, such reduction in chamber 22 will result in a gradual unbalancing of the diaphragm stack of said device 7 in favor of preponderance in pressure of control reservoir fluid in chamber 28 which will cause movement of the diaphragm stack in the direction of the brake pipe pressure chamber 19 to cause the slide valve 65 to assume its lap position, previously defined, to cut off communication between the supply reservoir recharge passage 60 and the slide valve chamber 26 as well as to disestablish communication by way of the slide valve passage 66 between the passage 62 and the brake cylinder passage 61, thereby terminating further release of fluid under pressure from the brake cylinder device 4.

At the time that the respective graduating control device 7 responds to the reduction in brake cylinder pressure as experienced in its brake cylinder pressure chamber 22 and assumes its lap position, the brake cylinder pressure thereby established, due to the differential in areas between the diaphragms 15 and 16 as previously mentioned in regard to application of the brakes, will be proportional to the prevailing brake pipe pressure existing in the chamber 19 according to the ratio of two and one-half to one, that is, every pound of increase in brake pipe pressure over that previously existing during a particular degree of brake application, will call for two and one-half pound reduction in brake cylinder pressure to effect movement of the diaphragm stack back to its lap position.

It should be pointed out that on any particular car employing the subject brake equipment, should the rate of increase in brake pipe pressure tend to become excessive such as on cars adjacent to the locomotive, such tendency will be realized by a corresponding tendency to overpressurization of the brake pipe pressure chamber 19 in the respective control device 7. The diaphragm stack of said device 7 will respond to such tendency to move in the direction of the control reservoir pressure chamber 28 and carry the respective slide valve 65, first to its release position defined by engagement of the annular flange 71 attached to the slide valve stem 30 with the spring stop 73, wherein fluid under pressure is released from the respective brake cylinder device 4 by way of the passages 61 and 62 and the port 66 in said slide valve, while uncovering port and passage 60a to allow for admittance of recharge fluid to the supply reservoir 3 by way of said brake pipe pressure chamber 19, device 90, passage 60 and chokes 96 and 97, as previously described. Thereafter, should the rate of increase in pressure of fluid in the brake pipe pressure chamber 19 continue to tend to become excessive, the respective diaphragm stack in the control device 7 will move further in the direction of the control reservoir pressure chamber 28 and carry the spring stop 73 with it against opposition of the spring 83 to advance the brake pipe pressure chamber supply control valve 21 in the direction of its seat 50 and establish a balance between the rate at which the pressure of fluid in the brake pipe pressure chamber 19 will increase relative to the resultant controlled rate of decrease in the brake cylinder pressure in chamber 22. Such control of rate of increase in pressure of fluid in the brake pipe pressure chamber 19 by automatic adjustment and position of the control valve 21 as just described, in turn regulates the rate of admission of supply of fluid under pressure from said chamber 19 to the supply reservoir 3 by way of the check valve device 90, passage 60 and chokes 96, 97. On such cars adjacent to the locomotive, by virtue of such control in admittance of fluid to brake pipe pressure chamber 19, fluid will not be utilized from the brake pipe for recharging the supply reservoir 3 at a rate which would unduly delay propagation of the brake pipe pressurization back through the train, thereby assuring that the succeeding control valve devices 7 thereon will be promptly brought into operation to effect the release of the respective brakes on such cars as well as in effecting recharge of the respective supply reservoirs thereon.

Under the circumstances where, on any particular car, pressure of fluid in the brake pipe 2 is increased to a value in excess of control reservoir pressure in the chamber 28 and such excessive brake pipe pressure persists for a sufficient length of time to allow the brake cylinder pressure to be reduced to atmospheric pressure via cavity 66 in the slide valve 65, when the balance of the diaphragm stack, as determined by the degree of pressure in the chamber 19 and in the control reservoir supply chamber 28 is restored, the stack will eventually assume a position in which the control valve 21 is seated on its seat 50 and preventing over-pressurization of the brake pipe pressure chamber 19 to any extent beyond seven-tenths of a pound above the control reservoir pressure existent in the chamber 28. The diaphragm stack in the respective graduating control device 7 will remain in its position in opposition to action of spring 83, with the brake cylinder pressure reduced to atmospheric pressure and the supply reservoir 3 charged to within one and seven-tenths pounds of the pressure existent in chamber 19 as determined by the spring value of the check valve device 90 so long as the excessive over-pressurization of the brake pipe on that particular car persists.

In the manner as described in the preceding paragraphs, the pressure of fluid in the brake cylinder device 4 may be graduated off in such steps as desired by proper step increases in pressure of the brake pipe 2, or increase in pressure in brake pipe 2 may be continuously uninterrupted. When the pressure in the brake pipe 2 and thereby in diaphragm chamber 19 finally becomes increased to within two or three pounds of the value of the normal pressure carried in the brake pipe, and which pressure is effective in the control reservoir 12 and acting in chamber 28 on diaphragm 18 of device 7, the balance thereby established on the diaphragm stack will hold said stack in its release position in which it is shown in the drawing as the pressure in the brake cylinder device 4 and chamber 22 is finally reduced to atmospheric pressure and the recharging of the supply reservoir 3 to within one and seven-tenths pounds of the pressure in brake pipe will occur.

When the pressure of fluid in the brake cylinder device 4 becomes reduced to a substantially ineffective value, such as five pounds, the force of the spring 136 in the inshot valve device 8 will move the piston 110 out of contact with the gasket 152 in the direction of chamber 101 to cause reseating of the valve 112 with its seat 128 while at the same time unseating the valve 139 from the seat 132, whereupon, fluid under pressure bottled up in the quick service volume chamber 14 and pressure chamber 170 in the control reservoir cutoff valve device 9 will release to the atmosphere by way of the choke 134, passage 133, the unseated valve 139 in the brake cylinder inshot valve device 8, and the port 154. This holding of fluid under pressure in the quick service reservoir 14 until the opening of the valve 139 in the brake cylinder inshot valve device 8, which does not occur until the brake application is substantially fully released, will prevent undesirable initiation of a quick service reduction in brake pipe pressure which would result in a shock-producing brake application, if while releasing, the operator should suddenly vent the brake pipe to effect a reapplication of the brakes and the quick service valve device 10 responded to assume its quick service position connecting the quick service volume to the brake pipe responsively to the reduction in brake pipe pressure intended to effect the reapplication of the brakes at that time. Under such circumstances where reapplication would be called for, according to the present arrangement the quick service reservoir 14 being still charged with fluid under pressure prior to operation of the brake cylinder inshot valve device 8 as above described to vent said volume to the atmosphere, quick service venting of fluid under pressure from the brake pipe will not therefore occur.

If while effecting release of the brakes, as above described, the control valve 21 in the respective graduating control device 7 is closed, as it may be momentarily on cars adjacent to the locomotive in which the brake pipe is over-pressurized, and the engineer desires to increase the degree of brake application and reduces brake pipe pressure accordingly, the spring 53 and valve sleeve 51 will allow said valve 21 to unseat and release fluid under pressure from said chamber 19 to equalize with the pressure existent in the brake pipe 2 to thereby assure prompt brake-applying response of the diaphragm stack in said device.

Subsequent to the operation of the brake cylinder inshot valve device 10 to its lowermost position as above described, in response to reduction in brake cylinder pressure to five pounds, when the brake cylinder pressure as realized in the chamber 175 in the cutoff valve device 9 further reduces and obtains the value of such as three pounds, providing that pressure of fluid in the quick service volume pressure chamber 170 in device 9 is also further reduced at that time by dissipation by way of passage of 170a, the quick service volume 14 and choke 134, the spring 180 will effect movement of the diaphragm stack in said device 9 upwardly, as viewed in the drawing, to its repose position in which its slide valve 183 re-establishes registry between the port 185 and the supply reservoir passage 27, and uncovers the brake pipe passage at the output side of the initial charge limiting choke 184 to the control reservoir pressure chamber 163 in said device 9. Upon such operation of the cutoff valve device 9, the pressure of fluid in the supply reservoir 3 and the control reservoir 12 will equalize by way of the control reservoir pressure chamber 163 in said device 9, while full recharging of same to their normal value will occur at the controlled rate by way of the initial charge limiting choke 184 and said chamber 163.

As previously described in connection with initial charging, at the time that the cutoff valve device 9 responds to return to its reservoir charging position as above described, should the control and supply reservoirs tend to become overcharged from the brake pipe by way of the limiting choke 184, upon re-establishing the brake pipe pressure normally carried in the brake pipe, such overcharge of these reservoirs will be rapidly dissipated by way of the combined capacities of the choke 184 and the choke 500 automatically brought into play by virtue of the arrangement of the check valve 501.

As will be readily apparent from previous description, if a car provided with this brake equipment is to be operated in passenger service, the service selector valve device 6 will be turned to its "Passenger" position in which the communication including choke 309 will be opened so that after operation of the inshot valve device 8 in response to a chosen pressure in the brake cylinder device 4, fluid under pressure will be supplied to the brake cylinder device at a controlled rate equal to the combined flow capacities of both the choke 310 and choke 309 to provide the desired faster rate of brake application for this service than permitted in freight service where choke 310 alone is effective. In case the car is to be operated in high speed passenger service, the service selector valve device 6 will be turned to "High Speed Passenger" position where the communication including choke 308 as well as choke 309 will be connected in parallel with that containing the choke 310 to provide an additional desired rate of increase in brake application for this type of service. In both regular "Passenger" and "High Speed Passenger" positions of the service selector valve device 6, both the chokes 315 and 312 will be connected in parallel one with the other and in turn in series with the choke 314 to provide for the more rapid rate of brake release in these types of service than is desired in freight service where chokes 312 and 314 alone are effective.

Regardless of the position of the service selector valve device 6, the operation of the brake equipment otherwise in response to either reduction or an increase in pressure of fluid in the brake pipe 2 is the same as hereinbefore described.

*Operation of release valve device 11*

If a trainman desires to release fluid under pressure from a respective brake cylinder device 4 on a particular car, or/and from the respective supply reservoir 3, or/and from the respective control reservoir 12 as well, he will operate lever 273 of device 11 to cause pivotal movement of actuating element 260 about pin 261 for advancing stems 265, 266 carried by said element toward valves 232, 250. According to the degree of such movement of element 260, the stem 266 may be brought into unseating engagement with valve 250 to allow for release of fluid under pressure from the brake cylinder device 4 via a branch of pipe and passage 23, chamber 227, opening 252, chamber 225 and opening 226, while valves 215 and 232 remain seated and closed. By subsequent additional movement of element 260 in the same direction, while stem 266 maintains unseating engagement with valve 250, the stem 265 may be made to unseat valve 232 for releasing fluid under pressure from the supply reservoir 3, in addition to release from brake cylinder device 4 as above, via a branch of pipe and passage 27, chamber 207, openings 240, counterbore 230 and chamber 225. By still further movement of element 260 in the same direction, stem 265 in engagement with valve 232 can be made to carry element 231 into engagement with stem 245 to cause unseating of valve 215 for releasing fluid under pressure from the control reservoir 12, in addition to release from the brake cylinder device 4 and from supply reservoir 3 as above described, via passage 164, chamber 163 in device 9, passage 206, and in device 11, the chamber 205, bore 210, chamber 207 and the unseated valve 232 as aforedescribed.

By reverse operation or release of the lever 273, the trainman may allow the element 260 to be returned by spring 270 to its repose position in which it is shown in the drawing with stems 265, 266 retracted, as springs 221, 241 and 254 are thus permitted to effect reseating of the valves 215, 232 and 250, respectively, to terminate venting of the control reservoir 12, supply reservoir 3, and brake cylinder device 4, respectively.

*Summary*

It will now be seen that I have provided a brake apparatus of the graduated release type which restricts the rate of initial charging of such apparatus on cars throughout a train to reduce the tendency for same to become overcharged, while assuring more even distribution of pressure of fluid in the brake pipe throughout the train during such initial charging, in behalf of uniformity of charge from car to car. In addition, the subject brake apparatus provides for relatively rapid dissipation of any overcharge back into the brake pipe should such overcharge become existent in spite of the provisions to discourage its existence. In addition, improved means are provided the apparatus for effecting a quick service reduction in brake pipe pressure locally on a respective car which assures realization of such reduction by the brake apparatus on succeeding cars even though interceded by non-brake-equipped cars or cars on which the brake apparatus may be cut out of operation.

Having now described my invention, what I claim as new and desire to secure by Letters Patent, is:

1. In a fluid pressure railway brake apparatus, the combination with a brake pipe; a brake cylinder; a supply reservoir; a control reservoir; brake controlling valve device comprising brake controlling valve means controlling supply of fluid under pressure from said supply reservoir to said brake cylinder and release of fluid under pressure therefrom and comprising a plurality of movable abutments operative responsively to variations in brake pipe and brake cylinder pressures relative to control reservoir pressure to cause said brake controlling valve means to assume a brake cylinder supply position, a brake cylinder pressure holding position, or a brake cylinder release position according to whether brake cylinder pressure is deficient, commensurate with, or in excess of, respectively, that called for as determined by the degree which brake pipe pressure exists below control reservoir pressure; a charging and overcharge dissipating communication normally open to said brake pipe and to said supply reservoir; a charging cut-off valve device having control chamber means to the pressurization of which said charging cut-off valve device responds to assume a cut-off position to close said charging and overcharge dissipating communication; and quick service control means responsive to a slight reduction in brake pressure relative to supply reservoir pressure to effect local brake pipe pressure reducing quick service withdrawal of fluid under pressure from said brake pipe and to effect simultaneous supply of fluid under pressure to said control chamber means in said charging cut-off valve device; of two chokes and a check valve included in said charging and overcharge dissipating communication arranged to permit flow of fluid under pressure therethrough from said brake pipe to said supply reservoir only via one of said chokes to conserve local utilization of brake pipe fluid during supply reservoir charging, and arranged to permit flow via both of said chokes during dissipation of overcharge from said supply reservoir to said brake pipe to hasten such dissipation.

2. The combination as set forth in claim 1, further characterized in that said brake pipe serves as the source of fluid under pressure supplied by said quick service control means to said control chamber means in said charging cut-off valve device.

3. The combination as set forth in claim 1, further characterized in that said charging and overcharge dissipating communication is also normally open to said control reservoir.

4. The combination as set forth in claim 1, including a communication connecting said control chamber means in said charging cut-off valve device with said brake cylinder for holding said charging cut-off valve device in its cut-off position while said brake cylinder is pressurized.

5. The combination as set forth in claim 1, including a quick service volume open to said control chamber means in said charging cut-off valve device into which fluid under pressure from said brake pipe may flow during withdrawal by said quick service control means, a restricted vent communication open to said quick service volume, and means responsive to brake cylinder pressures below and above a certain value to open and close, respectively, said restricted vent communication to the atmosphere.

6. The combination as set forth in claim 1, further including a restricted supply reservoir recharge communication for supplying fluid under pressure from said brake pipe to said supply reservoir independently of said charging and overcharge dissipating communication, spring-loaded recharge control check valve means having an outlet connected to said supply reservoir recharge communication and also having an inlet and being operative to prevent flow of fluid under pressure from its outlet to its inlet while permitting flow of fluid under pressure in the reverse direction so long as there exists a certain degree of preponderance in pressure in said inlet over that in said outlet, supply reservoir recharge cut-off control valve means comprised in said brake controlling valve device and operable by said plurality of movable abutments to open said supply reservoir recharge communication to said supply reservoir in brake cylinder release position of said brake controlling valve means and to close said supply reservoir to said supply reservoir recharge communication in brake cylinder supply position of said brake controlling valve means, and supply reservoir recharge supply control valve means comprised in said brake controlling valve device and operable by said plurality of movable abutments for controlling communication between said brake pipe and the inlet of said recharge control check valve means to limit the pressure of fluid therein to a degree, less than said certain degree required to unseat said recharge control check valve means, in excess of pressure of fluid in said control reservoir during charging of same, and to limit the rate of build-up in pressure of fluid in said inlet during a brake release according to rate of reduction in brake cylinder pressure.

7. The combination as set forth in claim 6, further including a restricted supply reservoir maintenance communication constantly connected to said supply reservoir and to the outlet of said recharge control check valve means in by-pass of said restricted supply reservoir recharge communication.

References Cited in the file of this patent
UNITED STATES PATENTS

| | | |
|---|---|---|
| 1,671,089 | Farmer | May 22, 1928 |
| 2,027,469 | Campbell | Jan. 14, 1936 |
| 2,039,732 | McCune | May 5, 1936 |
| 2,088,167 | Fitch | July 27, 1937 |
| 2,661,248 | Keller | Dec. 1, 1953 |